US012088446B2

(12) United States Patent
Berggren et al.

(10) Patent No.: US 12,088,446 B2
(45) Date of Patent: Sep. 10, 2024

(54) BANDWIDTH PARTS FOR POSITIONING SIGNALS

(71) Applicant: Sony Group Corporation, Tokyo (JP)

(72) Inventors: Anders Berggren, Lund (SE); Basuki Priyanto, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/609,546

(22) PCT Filed: Apr. 9, 2020

(86) PCT No.: PCT/EP2020/060177
§ 371 (c)(1),
(2) Date: Nov. 8, 2021

(87) PCT Pub. No.: WO2020/229066
PCT Pub. Date: Nov. 19, 2020

(65) Prior Publication Data
US 2022/0229145 A1    Jul. 21, 2022

(30) Foreign Application Priority Data

May 10, 2019  (SE) .................................. 1930152-2

(51) Int. Cl.
*H04W 4/00*     (2018.01)
*G01S 5/00*     (2006.01)
(Continued)

(52) U.S. Cl.
CPC ........ *H04L 27/2613* (2013.01); *G01S 5/0063* (2013.01); *H04L 5/0044* (2013.01);
(Continued)

(58) Field of Classification Search
None
See application file for complete search history.

(56) References Cited

U.S. PATENT DOCUMENTS 9,820,281 B1    11/2017   Werner
2013/0308481 A1*  11/2013  Kazmi .................. H04W 24/02
                                                            370/252
(Continued)

FOREIGN PATENT DOCUMENTS

CN    108934075 A    12/2018
CN    109155983 A     1/2019
(Continued)

OTHER PUBLICATIONS

International Search Report and Written Opinion from corresponding International Application No. PCT/EP2020/060177, Jul. 24, 2020, 13 pages.
(Continued)

*Primary Examiner* — Zewdu A Beyen
(74) *Attorney, Agent, or Firm* — Tucker Ellis LLP

(57) ABSTRACT

A method of operating a UE includes receiving a configuration of multiple bandwidth parts. Each bandwidth part of the multiple bandwidth parts is associated with a respective access node of multiple access nodes. The method also includes receiving positioning signals on each bandwidth part of the multiple bandwidth part from the respectively associate access node of the multiple access nodes. Said receiving is in accordance with the configuration. The method also includes participating in positioning of the UW based on said receiving of the positioning signals.

15 Claims, 12 Drawing Sheets

(51) Int. Cl.
*H04L 5/00* (2006.01)
*H04L 27/26* (2006.01)
(52) U.S. Cl.
CPC .......... *H04L 5/0082* (2013.01); *H04L 5/0092* (2013.01); *H04L 27/26025* (2021.01)

(56) References Cited

U.S. PATENT DOCUMENTS

| | | |
|---|---|---|
| 2016/0286552 A1 | 9/2016 | Lim |
| 2018/0020423 A1 | 1/2018 | Wang |
| 2019/0007923 A1 | 1/2019 | Blankenship |
| 2019/0090092 A1 | 3/2019 | Iwang |

FOREIGN PATENT DOCUMENTS

| | | | |
|---|---|---|---|
| CN | 109565830 A | | 4/2019 |
| WO | WO-2012112102 A1 | | 8/2012 |
| WO | WO-2018236197 A1 | | 12/2018 |

OTHER PUBLICATIONS

Samsung, "DL and UL Reference Signals Design for NR Positioning," 3GPP TSG RAN WG1 #96b, R1-1904394, Apr. 8-12, 2019, 16 pages.
Vivo, "Discussion on DL and UL RS for NR positioning," 3GPP TSG RAN WG1 #96bis, R1-1904107, Apr. 8-12, 2019, 14 pages.
NTT Docomo Inc., "DL PRS receiving procedure outside measurement gap," 3GPP TSG RAN WG1 #97, R1-1906229, May 13-17, 2019, 4 pages.
Samsung, "DL Reference Signals for NR Positioning, " 3GPP TSG RAN WG1 #97, R1-1906907, May 13-17, 2019, 12 pages.
Office Action and Search Report from corresponding Swedish Application No. 1930152-2, mailed on Dec. 6, 2019, 7 pages.
Nokia, "Views on DL reference signals for NR Positioning," 3GPP TSG RAN WG1 #97, R1-1906658, dated May 13-17, 2019, 5 pages.
Huawei, Hisilicon, "DL and UL Reference Signals for NR Positioning", Apr. 8-12, 2019, 3GPP TSG RAN WG1 Meeting #96bis, R1-1904004, 13 pgs., Xi'an China.
Huawei et al., "DL RS design for NR positioning", 3GPP TSG RAN WG1 #97, 3GPP, (May 3, 2019), R1-1906052.
Intel Corporation, "Design of Downlink Reference Signals for NR Positioning", 3GPP TSG RAN WG1 #97, 3GPP, (May 4, 2019), R1-1906821.
Intel, "Summary for NR-Positioning AI—7.2.10.1.1 DL only Based Positioning", 3GPP TSG RAN WG1 #96, 3GPP, (Feb. 26, 2019), R1-1903394.
Intel Corporation, On Radio-Layer Procedures for NR Positioning, 3GPP TSG RAN WGI Meeting #96bis RI-1904322, May 4, 2019 , pp. 1-11.
MediaTek Inc., Procedure design for NR positioning, 3GPP TSG-RAN WGI#97 Meeting RI-1906564, May 4, 2019 , pp. 1-7.
Huawei et al., "Physical layer procedure for NR positioning", 3GPP TSG RAN WG1 #97, 3GPP, May 3, 2019, R1-1906055.
Samsung, "Discussion on necessity and details for physical-layer procedures to support UE/gNB measurements", 3GPP TSG RAN WG1 #97, 3GPP, May 3, 2019, R1-1906910.

* cited by examiner

BANDWIDTH PARTS FOR POSITIONING SIGNALS

TECHNICAL FIELD

Various examples of the invention generally relate to positioning of wireless communication devices using positioning signals transmitted by multiple access nodes. Various examples specifically relate to using bandwidth parts to transmit the positioning signals.

BACKGROUND

To facilitate positioning of wireless communication devices (sometimes also referred to as user equipment, UE), multilateration and multiangulation techniques can be employed. An example of multiangulation is triangulation. Here, multiple access nodes (AN)—having a well-defined position in a reference coordinate system—transmit positioning signals (also referred to as positioning reference signals, PRSs). A UE can receive the PRSs and then trigger a multilateration or multiangulation. One particular technique is observed time-difference of arrival (OTDOA).

OTDOA is, in particular, deployed in Third Generation Partnership (3GPP) cellular networks, such as the Long Term Evolution (LTE) 4G or New Radio (NR) 5G protocols. Here, the UE receives PRSs from multiple base stations (BSs) implementing the ANs and then performs a timing difference of arrival (TDOA) measurement. Results of the TDOA measurements are transmitted from the UE to a location server (LS) using a positioning protocol (PP). This is via the 3GPP radio access network (RAN). The LS then performs the positioning estimation based on multilateration and/or multiangulation of at least two or at least three results of the TDOA measurements. See 3GPP Technical specification (TS) 36.305, V15.0.0 (2018-07), section 4.3.2.

In the 3GPP LTE protocol, the PRSs have a defined resource mapping to time-frequency resource elements of a resource grid. For example, reference is made to 3GPP TS 36.211, section 6.10.4, FIG. 6.10.4.2-1 (here reproduced as FIG. 16): here, the resource mapping is illustrated for both one or two transmit antenna ports, and four antenna ports. The resource mapping has a diagonal pattern. The resource mapping allocates time-frequency resources for the PRSs every sixth subcarrier and therefore, it supports a reuse factor of up to 6: up to six BSs could transmit using respective complimentary resource mappings. The complimentary resource mappings use time-frequency resources for the PRS transmission that are shifted in frequency domain and/or time domain within a common resource grid of a timeslot or subframe, so that the UE can receive all PRSs according to the complimentary resource mappings. The complimentary resource mappings implement time domain and frequency domain multiplexing within a common resource grid and common timeslot. A given subframe including two timeslots is dedicated, i.e., exclusively reserved, for PRS transmission. There are no other signals/channels within that subframe (except common reference signal (CRS)) to avoid interference. The PRS transmission is reconfigurable. It can be transmitted in the whole LTE system bandwidth. The PRS can be transmitted in N consecutive subframes with M PRS periodicity. N varies from 1 to 6 ms and M is from 160-1280 ms. The PRS is used by the UE to estimate time of arrival (TOA).

For PRSs transmission in 3GPP NR, see 3GPP R1-1905703.

Such techniques face certain restrictions and drawbacks. For example, a flexibility of transmitting the PRSs in view of a variable configuration of a wireless link supported by the 3GPP RAN can be limited. Then, the flexible configuration of the wireless link can be impaired by the need to accommodate for the PRSs.

In further detail, 3GPP NR supports multiple numerologies and thus subcarrier spacings. While 3GPP LTE only uses 15 kHz subcarrier spacing, different numerologies can be used in 3GPP NR depending on the use cases (e.g., eMBB, URLLC, mMTC). Since PRSs are received from multiple BSs for multilateration and/or multiangulation, the different numerologies can make it difficult to implement multiplexing in frequency domain and/or time domain across the multiple BSs.

SUMMARY

Therefore, a need exists for advanced techniques of transmitting PRSs. In particular, a need exists for advanced techniques which overcome or mitigate at least some of the above-identified restrictions or drawbacks. In particular, there is a need for techniques which facilitate PRSs transmission in communication systems supporting multiple numerologies.

This need is met by the features of the independent claims. The features of the dependent claims define embodiments.

A method of operating a UE includes receiving a configuration of multiple bandwidth parts. Each bandwidth part of the multiple bandwidth parts is associated with a respective access node of multiple access nodes. The method also includes receiving positioning signals on each bandwidth part of the multiple bandwidth part from the respectively associate access node of the multiple access nodes. Said receiving is in accordance with the configuration. The method also includes participating in positioning of the UW based on said receiving of the positioning signals.

A computer program or a computer-program product or a computer-readable storage medium includes program code to be executed by at least one processor. Executing the program code causes the at least one processor to perform a method of operating a UE. The method includes receiving a configuration of multiple bandwidth parts. Each bandwidth part of the multiple bandwidth parts is associated with a respective access node of multiple access nodes. The method also includes receiving positioning signals on each bandwidth part of the multiple bandwidth part from the respectively associate access node of the multiple access nodes. Said receiving is in accordance with the configuration. The method also includes participating in positioning of the UW based on said receiving of the positioning signals.

A UE includes control circuitry, the control circuitry being configured to: receive a configuration of multiple bandwidth parts, each bandwidth part of the multiple bandwidth parts being associated with a respective access node of multiple access nodes; and to receive, in accordance with the configuration, positioning signals on each bandwidth part of the multiple bandwidth parts from the respectively associated access node of the multiple access nodes; and to participate in positioning of the wireless communication device based on said receiving of the positioning signals.

A method of operating a network node of a network includes determining a configuration of one or more bandwidth parts for positioning signals. The positioning signals are to be transmitted by one or more access nodes of the network. The method also includes providing the configuration of the one or more bandwidth parts to one or more UEs. The method also includes triggering transmission of the positioning signals on the one or more bandwidth parts in accordance with the configuration.

A computer program or a computer-program product or a computer-readable storage medium includes program code to be executed by at least one processor. Executing the program code causes the at least one processor to perform a method of operating a network node of a network includes determining a configuration of one or more bandwidth parts for positioning signals. The positioning signals are to be transmitted by one or more access nodes of the network. The method also includes providing the configuration of the one or more bandwidth parts to one or more UEs. The method also includes triggering transmission of the positioning signals on the one or more bandwidth parts in accordance with the configuration.

A network node of a network includes control circuitry, the control circuitry being configured to: determine a configuration of one or more bandwidth parts for positioning signals to be transmitted by one or more access nodes of the network; and to provide the configuration of the one or more bandwidth parts to one or more wireless communication devices; and to trigger transmission of the positioning signals on the one or more bandwidth parts in accordance with the configuration.

For example, the network node could be a location server or one of the one or more access nodes.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
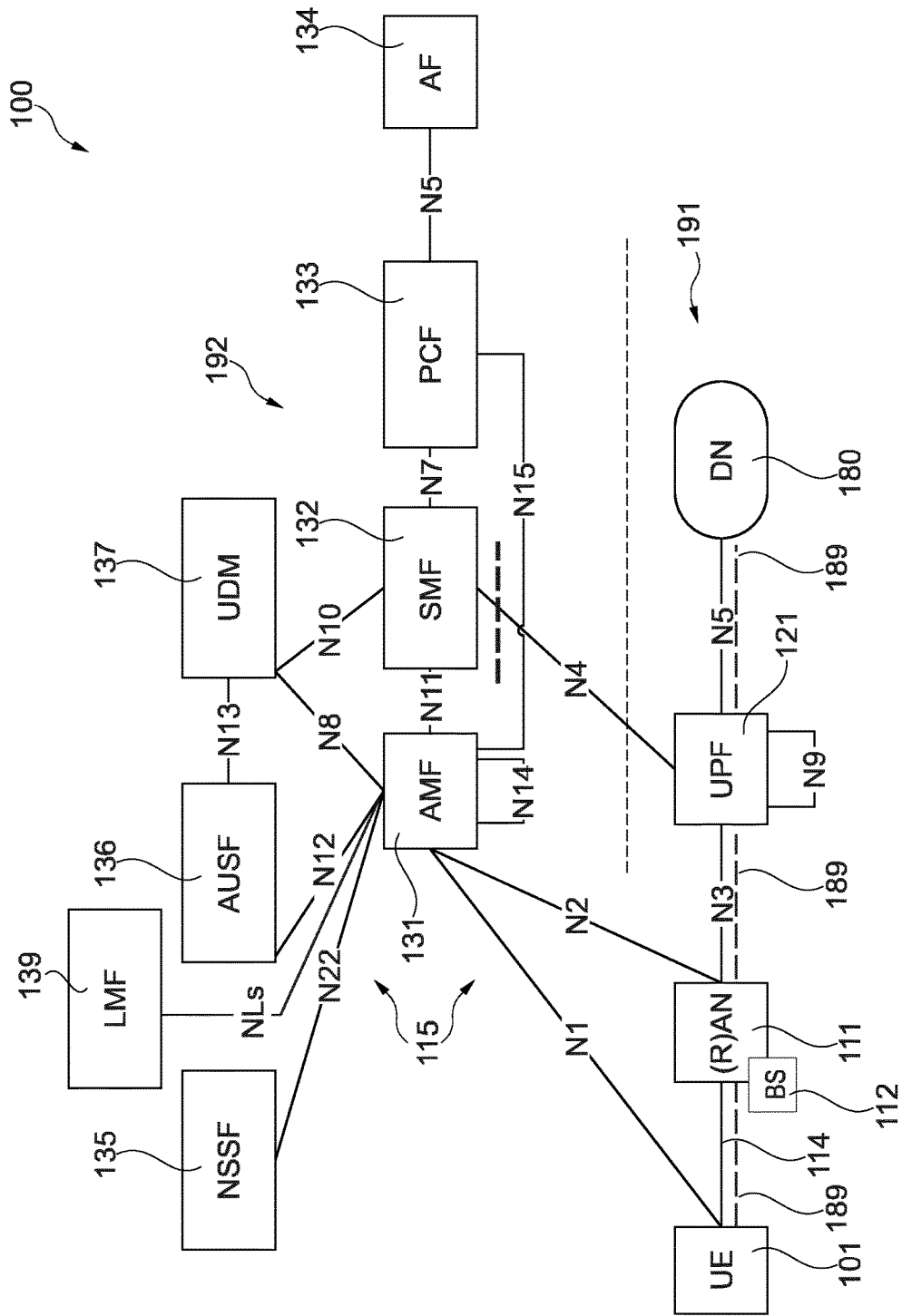
FIG. 1 schematically illustrates a cellular network according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques which facilitate positioning of UEs are described. The techniques described herein generally rely on the transmission of PRSs. These PRSs are transmitted by multiple ANs and can be received by a target UE to be positioned. The ANs can have a well-defined position within a reference coordinate system and the target UE can be positioned within the reference coordinate system.

According to various examples described herein, transmission of the PRSs may be implemented on a wireless link on which also transmission of further signals is implemented. In particular, the further signals may encode, e.g., control messages or payload messages. The wireless link may operate according to a transmission protocol. For example, the transmission protocol may employ Orthogonal Frequency Division Multiplex (OFDM) modulation. Here, a carrier comprises multiple subcarrier and one or more associated time-frequency resource grids are defined. For example, the transmission protocol may be associated with a RAN of a cellular network; here, the ANs can be implemented by BSs of the RAN.

According to the various techniques described herein, the positioning may employ a multilateration and/or multiangulation based on one or more receive properties of the PRSs transmitted by multiple ANs. It would be possible that the logic for implementing said positioning partly or fully resides at the UE to be positioned, and/or partly or fully resides at a LS. For example, it would be possible that the UE reports raw measurement data associated with the one or more receive properties of the PRSs to the LS and that the multilateration and/or multiangulation is implemented at the LS. It would also be possible that at least a part of the processing of the multilateration and/or multiangulation etc. is implemented at the UE. The positioning may generally comprise OTDOA.

In the techniques described herein, the concepts of PRS transmission are combined with concepts of bandwidth parts (BWPs). In general, different BWPs may be employed, depending on the payload size and traffic or signal type, for power saving purposes. For example, the UE can use a narrow BWP for monitoring control channels and only open the full bandwidth of the carrier when a large amount of data is scheduled.

Various techniques herein are based on the finding that it can be helpful to implement transmission of PRSs on one or more associated BWPs (hereinafter, positioning BWPs, P-BWPs). As a general rule, it would be possible that the one or more P-BWPs are exclusively reserved for the transmission of the PRSs; or that the one or more P-BWPs are shared between the transmission of the PRSs and the transmission of one or more further signals.

According to various examples, a UE receives PRSs on multiple P-BWPs from multiple BSs. Each P-BWP is associated with a respective one of the multiple BSs. Thus, the P-BWPs are cell specific for the cell supported by the respective BSs. A corresponding configuration of the multiple P-BWPs may be provided to the UE. As a general rule, P-BWPs are characterized with respect to their numerology, i.e., subcarrier spacing (SCS). Thus, the configuration can be indicative of the numerologies of the P-BWPs.

Alternatively or additionally, the configuration could also be indicative of further configuration parameters of the P-BWPs. To name a few examples: frequency; transmission timing; puncturing of PRS transmission on a given P-BWP; activation or deactivation of a given P-BWP.

Next, details with respect to the relationship between the multiple P-BWPs will be explained:

As a general rule, it would be possible that the configuration of the multiple P-BWPs is indicative of common configuration parameters for at least some of the multiple P-BWPs, i.e., shared P-BWPs can be defined. For example, shared P-BWPs that are associated with the multiple BSs may use the same common frequency, the same common numerology, the same common transmission timing, and the same common antenna port.

It would also be possible that the configuration of the multiple P-BWPs is indicative of at least partially different configuration parameters for at least some of the multiple P-BWPs. For example, where two P-BWPs have at least partially different configuration parameters, the may use different frequency, different numerologies, different transmission timings, and/or different antenna ports. Hence, other P-BWPs may be used.

In the various examples described herein, the P-BWPs may be flexibly adapted. In other words, it becomes possible to flexibly determine and set the configuration of the P-BWPs. For example, at least one of a numerology (e.g., subcarrier spacing, SCS, of subcarriers of an OFDM carrier), frequency bandwidth or frequency position, and/or transmission timing of the P-BWPs can be flexibly set, to give just a few examples of possible configuration parameters that are subject to a respective configuration of the P-BWPs. It would also be possible to activate/deactivate a given P-BWP. For example, A BS can deactivate P-BWP and use it for other purposes, such as data communication or just simply not transmit at all to transmit lean carrier. The UE is expected to use P-BWP from other BSs.

Such use of P-BWPs helps to facilitate supporting a flexible transmission settings and, in particular, flexible numerology for different BSs of a cellular network. For example, the following scenario would be possible: There are six BSs and two BSs use numerology A and four BSs use numerology B. Then, the two BSs can use first shared P-BWPs having numerology A and the four BSs can use second shared BWPs having numerology B. The PRSs are transmitted by the two BSs on the respective first shared P-BWPs using complimentary resource mappings, i.e., using time-frequency resources that are offset within the same resource grid in the same timeslots. Likewise, the PRSs are transmitted by the four BSs on the respective second shared P-BWPs using further complimentary resource mappings. In such a scenario, once a UE in a cell knows the P-BWP(s) used by that cell, it can expect the availability of PRS or P-BWPs from multiple cells.

FIG. 1 schematically illustrates a cellular network 100. The example of FIG. 1 illustrates the network 100 according to the 3GPP 5G architecture. Details of the 3GPP 5G architecture are described in 3GPP TS 23.501, version 1.3.0 (2017-09). While FIG. 1 and further parts of the following description illustrate techniques in the 3GPP 5G framework of a cellular network, similar techniques may be readily applied to other communication networks. Examples include e.g., an IEEE Wi-Fi technology.

In the scenario of FIG. 1, a UE 101 is connectable to the cellular network 100. For example, the UE 101 may be one of the following: a cellular phone; a smart phone; and IOT device; a MTC device; a sensor; an actuator; etc.

The UE 101 is connectable to the network 100 via a RAN 111, typically formed by one or more BSs 112 (only a single BS 112 is illustrated in FIG. 1 for sake of simplicity; the BSs implement ANs). A wireless link 114 is established between the RAN 111—specifically between one or more of the BSs 112 of the RAN 111—and the UE 101. The wireless link 114 is defined by one or more OFDM carriers.

The RAN 111 is connected to a core network (CN) 115. The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data network 180, e.g., the Internet or a Local Area Network. Application data can be communicated between the UE 101 and one or more servers on the data network 180.

The network 100 also includes an Access and Mobility Management Function (AMF) 131; a Session Management Function (SMF) 132; a Policy Control Function (PCF) 133; an Application Function (AF) 134; a Network Slice Selection Function (NSSF) 134; an Authentication Server Function (AUSF) 136; a Unified Data Management (UDM) 137; and a Location Management Function (LMF) 139. FIG. 1 also illustrates the protocol reference points N1-N22 between these nodes.

The AMF 131 provides one or more of the following functionalities: registration management; NAS termination; connection management; reachability management; mobility management; access authentication; and access authorization. A data connection 189 is established by the AMF 131 if the respective UE 101 operates in a connected mode.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc. As such, the AMF 131 and the SMF 132 both implement CP mobility management needed to support a moving UE.

The data connection 189 is established between the UE 101 via the RAN 111 and the data plane 191 of the CN 115 and towards the DN 180. For example, a connection with the Internet or another packet data network can be established. To establish the data connection 189, it is possible that the respective UE 101 performs a random access (RACH) procedure, e.g., in response to reception of a paging indicator or paging message and, optionally, a preceding WUS. A server of the DN 180 may host a service for which payload data is communicated via the data connection 189. The data connection 189 may include one or more bearers such as a dedicated bearer or a default bearer. The data connection 189 may be defined on the RRC layer, e.g., generally Layer 3 of the OSI model of Layer 2.

The LMF 139 is implemented by LS. The LMF 139 handles location service requests. This may include transferring assistance data to the target UE 101 to be positioned to assist with UE-based and/or UE-assisted positioning and/or may include positioning of the target UE. See 3GPP TS 38.305 V15.3.0 (2019-03), section 5.1. For downlink (DL) positioning using PRSs, the LMF 139 may instigate location procedures using a positioning protocol with the UE 101—e.g. to obtain a location estimate or positioning measurements or to transfer location assistance data to the UE 101. The LMF 139 can transmit a configuration regarding BWPs to the UE 101.

Figure 2:
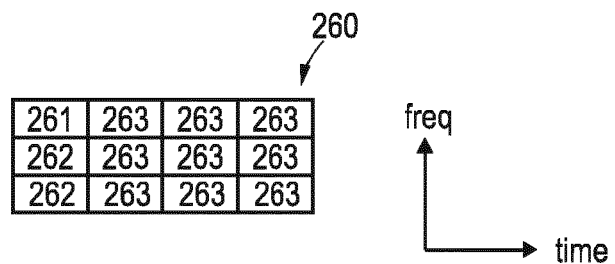
FIG. 2 schematically illustrates a resource mapping of various channels implemented on a wireless link of the cellular network according to various examples.

FIG. 2 illustrates aspects with respect to channels 261-263 implemented on the wireless link 114. The wireless link 114 implements a plurality of channels 261-263. The resources of the channels 261-263 are offset from each other, e.g., in frequency domain and/or time domain, in accordance with a respective resource mapping. The resources may be defined in a time-frequency grid defined by the symbols and subcarriers of the OFDM modulation of the carrier.

A first channel 261 may carry PRSs.

A second channel 262 may carry further reference signals, e.g., Channel State Indication reference signals (CSI-RS), Demodulation reference signals (DMRS), or synchronization reference signals (PSS/SSS), etc.

Further, a third channel 263 is associated with a payload messages carrying higher-layer user-plane data packets associated with a given service implemented by the UE 101 and the BS 112 (payload channel 263). User-data messages may be transmitted via the payload channel 263. Alternatively, control messages may be transmitted via the channel 263, e.g., control messages of a positioning protocol. For example, a configuration of BWPs used for PRS transmission may be included in the control messages of the PP.

Figure 3:
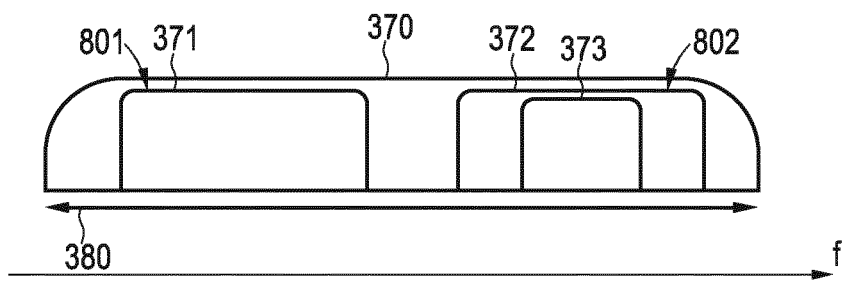
FIG. 3 schematically illustrates bandwidth parts implemented on the wireless link of the cellular network according to various examples.

FIG. 3 illustrates aspects in connection with a carrier 370 of the wireless link 114. FIG. 3 schematically illustrates a bandwidth 380 of the carrier 370. For example, the carrier 370 can operate according to OFDM and can include multiple subcarriers (not illustrated in FIG. 3).

FIG. 3 further illustrates aspects of BWPs 371-372. The BWPs 371-372, respectively, occupy an associated subfraction of the overall bandwidth 380. The BWP 372 includes a sub-BWP 373, having a smaller BW and being associated with the BWP 372.

For example, allocation of resource elements of the time-frequency grid for transmission of various signals, including PRSs, can be relatively defined with respect to the respective BWP 371-373. Each BWP 371-373 can be defined as a subset of continuous and contiguous common physical resource blocks (PRBs), each PRB defining a set of resources in the time-frequency grid. A receiver of the UE 101, if configured to monitor, e.g., the BWP 371, can limit its receive bandwidth correspondingly. As a general rule, each BWP 371-372 and sub-BWP 373 each can have a unique OFDM numerology. As illustrated in FIG. 3, the BWP 371 implements a first numerology 801; while the BWP 372 and the sub-BWP 373 implement a second numerology 802. By switching between different BWPs, the wireless system can dynamically switch between different frequency bandwidths being utilized for communicating with the different UEs or different channels. Also, by the use of different numerologies in different BWPs, different QoS levels may be achieved due to the numerology relation to the OFDM symbol length.

As a general rule, there are various parameters conceivable that are affected by the respective setting of the OFDM numerology 801, 802. To give a few examples, the SCS of subcarriers of the carrier 370 can vary. Also, the number of time slots per subframe can depend on the setting of the OFDM numerology 801, 802. For example, the number of OFDM symbols per time slot can thereby vary along with the change of the settings of the OFDM numerology 801, 802. The cyclic prefix length can vary with the change of SCS. In a further example, the time division duplex (TDD) partitioning can vary, depending on the setting of the numerology 801, 802. To give an example, the SCS may vary between 15 kHz and 120 kHz, e.g., in four different numerology settings.

Figure 4:
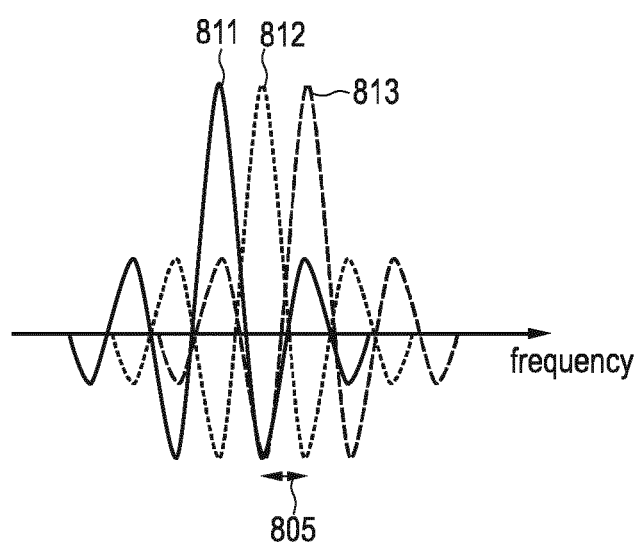
FIG. 4 schematically illustrates subcarriers of a carrier of the wireless link implementing Orthogonal Frequency Division Multiplexing.

FIG. 4 illustrates aspects with respect to communicating on the wireless link 114. Specifically, FIG. 4 illustrates aspects with respect to modulation of signals to be communicated on the wireless link 114.

Specifically, FIG. 4, upper part, illustrates multiple subcarriers 811-813 in frequency domain used for OFDM modulation. Different subcarriers 811-813 are orthogonal with respect to each other and thus can each encode specific information with reduced interference. As a general rule, OFDM modulation may employ a variable count of subcarriers 811-813, e.g., between twenty and two thousand subcarriers. The count of subcarriers can vary as a setting of the OFDM numerology 801, 802. FIG. 4 also illustrates the SCS 805 of the current setting of the OFDM numerology 801, 802.

As will be appreciated from FIG. 4, different SCSs 805 result in different time-frequency resource grids. Accordingly, where different BSs employ different SCS 805, it is sometimes difficult to obtain complimentary resource mappings that allow frequency reuse across the multiple BSs for transmission of PRSs. The techniques described herein mitigate these problems by using P-BWPs for the transmission of PRSs and by assigning a specific numerology to each P-BWP. Shared P-BWPs may use the same numerology; while multiple P-BWPs may be used to accommodate for different numerologies. Next, details with respect to such downlink (DL) positioning techniques using PRSs are explained in connection with FIG. 5.

Figure 5:
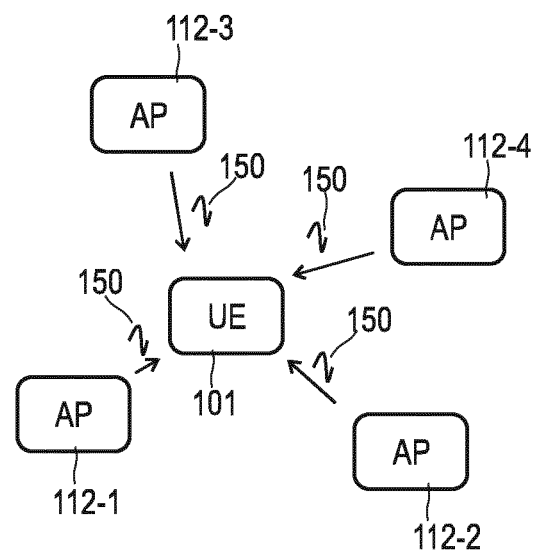
FIG. 5 schematically illustrates transmission of PRSs according to various examples.

FIG. 5 schematically illustrates aspects with respect to DL positioning techniques for a target UE 101 to be positioned. Multiple BSs 112-1-112-4 transmit DL PRSs 150 and the UE 101 receives the PRSs 150. Then, the UE 101 can participate in positioning. This can include determining one or more receive properties of the PRSs 150, determining a TOA of the PRSs 150, determining a TDOA of the PRSs 150, and/or performing multilateration and/or multiangulation based on the TDOA. At least some of these tasks can also be performed by the LMF 139 or, more generally, an LS.

Figure 6:
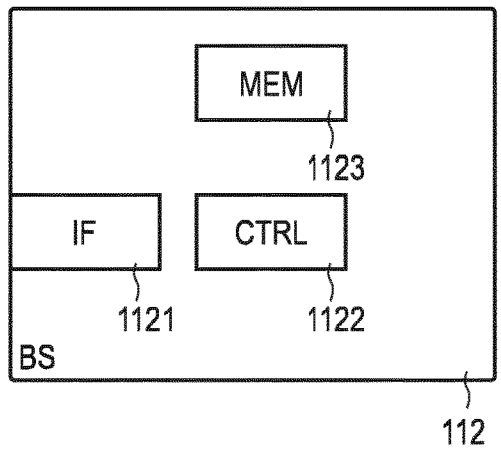
FIG. 6 schematically illustrates a BS according to various examples.

FIG. 6 schematically illustrates the BS 112. For example, the BSs 112-1-112-4 could be configured accordingly. The BS 112 includes an interface 1121. For example, the interface 1121 may include an analog front end and a digital front end. The interface 1121 can support multiple signal designs, e.g., different modulation schemes, coding schemes, modulation numerologies, and/or multiplexing schemes, etc. Multiple BWPs are supported. The BS 112 further includes control circuitry 1122, e.g., implemented by means of one or more processors and software. For example, program code to be executed by the control circuitry 1122 may be stored in a non-volatile memory 1123.

In the various examples disclosed herein, various functionality may be implemented by the control circuitry 1122, e.g.: determining a configuration of one or more BWPs including one or more P-BWPs; adapting one or more BWPs, in particular P-BWPs; transmitting PRS on the one or more P-BWPs in accordance with the configuration; etc.

Figure 7:
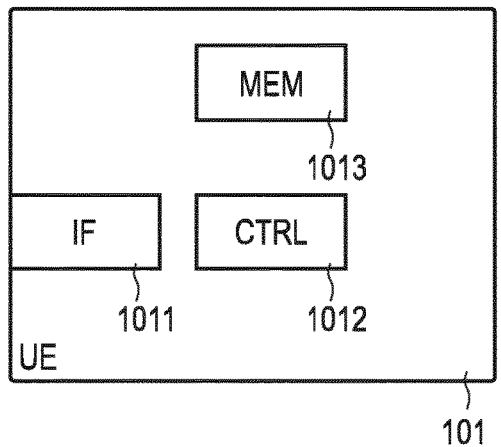
FIG. 7 schematically illustrates a UE according to various examples.

FIG. 7 schematically illustrates the UE 101. The UE 101 includes an interface 1011. For example, the interface 1011 may include an analog front end and a digital front end. The UE 101 further includes control circuitry 1012, e.g., implemented by means of one or more processors and software. The control circuitry 1012 may also be at least partly implemented in hardware. For example, program code to be executed by the control circuitry 1012 may be stored in a non-volatile memory 1013. In the various examples disclosed herein, various functionality may be implemented by the control circuitry 1012, e.g.: receiving a configuration of one or more BWPs, including one or more P-BWPs; switching between different BWPs including P-BWPs; implementing measurement gaps for receiving PRSs; receiving PRSs on the P-BWPs in accordance with the configuration; participating in a positioning of the UE 101 based on one or more receive properties of the PRSs, e.g., including determining TOAs of the PRSs, determining TDOA, multilateration and/or multiangulation. A receive bandwidth with which the PRSs are received may depend on at least one of an accuracy of said positioning or a receiver bandwidth capability of the UE 101.

Figure 8:
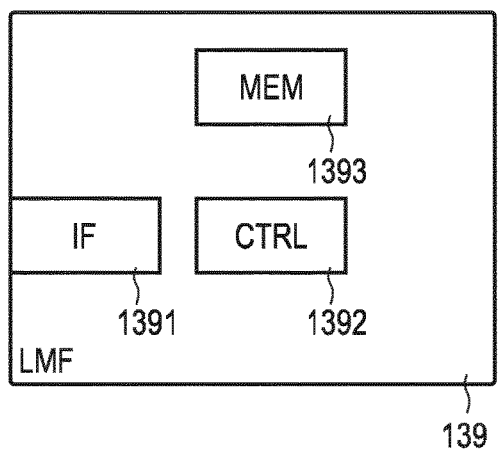
FIG. 8 schematically illustrates an LS according to various examples.

FIG. 8 schematically illustrates an LS that implements, in the example of FIG. 8, the LMF 139. The LMF 139 includes an interface 1391 for communicating with other nodes of the CN 115 or with the RAN 111 of the cellular network 100.

The LMF 139 further includes control circuitry 1392, e.g., implemented by means of one or more processors and software. For example, program code to be executed by the control circuitry 1392 may be stored in a non-volatile memory 1393. In the various examples disclosed herein, various functionality may be implemented by the control circuitry 1392, e.g.: determining a configuration of one or more BWPs including one or more P-BWPs; providing the configuration to one or more UEs 101; providing the configuration to one or more BSs 112, 112-1-112-4 of the RAN 111; participating in positioning of a UE 101, e.g., based on one or more receive properties of the PRSs such as TOA or TDOA, etc.

Figure 9:
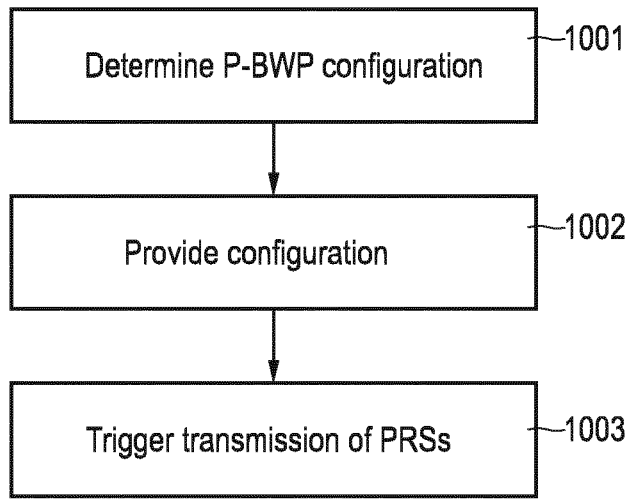
FIG. 9 is a flowchart of a method according to various examples.

FIG. 9 is a flowchart of a method according to various examples. The method of FIG. 9 can be executed by a node of a communication network, e.g., by a node of the cellular network 100 (cf. FIG. 1). For example, the method of FIG. 9 could be implemented by a BS 112, 112-1-112-4 of the RAN 111; however, it would also be possible that the method of FIG. 9 is implemented by the LMF 139 or another node of the cellular network 100. For example, the method of FIG. 9 may be executed by the control circuitry 1122 of the BS 112 or the control circuitry 1392 of the LMF 139 upon loading program code from the memory 1123 or 1393, respectively.

Initially, at box 1001, a configuration of one or more P-BWP that are associated with a respective BS is determined. The one or more P-BWPs are for PRSs transmission by the respective BS to one or more UEs. Thus, the one or more P-BWPs are cell-specific for the cell associated with the respective BS.

For example, if the BS is capable of wideband transmission, multiple P-BWPs can be associated with that BS, wherein the multiple P-BWPs can be in multiple component carriers (CC).

As a general rule, the one or more P-BWPs could be exclusively reserved for the transmission of the PRSs. I.e., in a scenario in which a P-BWP exclusively reserved for the transmission of the PRSs, no further signals are allocated to time-frequency resources of the P-BWP.

In some examples, to determine the configuration, it would be possible that one or more further configurations of one or more further P-BWPs of one or more further BSs are taken into account. For example, core network control signaling or inter-BS control signaling can be used to obtain the one or more further configurations. Then, it would be possible that the configuration of the one or more P-BWPs is determined such that the P-BWP is compatible with the one or more further P-BWPs. This facilitates reception of the PRSs from the various BS at the UE and hence facilitates accurate positioning. For example, shared P-BWPs could be determined that use common configuration parameters, e.g., the same numerology, transmission timing, frequency, antenna port configuration, beam configuration, etc. In other examples, different P-BWPs could be determined that use different configuration parameters. These findings are explained in detail below:

As a general rule, it would be possible that the one or more further P-BWPs used for PRS transmission by the one or more further BSs are different if compared to the one or more P-BWPs used for PRS transmission by the BS. For example, the one or more further P-BWPs may have a different bandwidth if compared to the one or more P-BWPs. For example, frequency multiplexing and/or time multiplexing may be used: i.e., the transmission timing and/or the frequency of the one or more P-BWPs may be offset, but aligned accordingly with the transmission timing and/or frequency of the one or more further P-BWPs. The one or more further P-BWPs and the one or more P-BWPs may use different numerologies.

Alternatively, it would also be possible that the one or more further P-BWPs used for PRS transmission by the one or more further BSs are the same than the one or more P-BWPs used for PRS transmission by the BS. In other words, in some examples, it would be possible that a reuse of a common time-frequency grid of P-BWP is implemented (shared P-BWPs), by using a common numerology, a common frequency and a common transmission timing. Here, complimentary resource mappings can be used for the PRS transmission on the shared P-BWPs.

As a general rule, where complimentary resource mappings are used, the time-frequency resources allocated to the transmission of the PRSs on different P-BWPs can be defined offset with respect to each other in the same time-frequency resource grid of a given time slot or subframe. I.e., a reuse factor of two, three, etc. could be defined. The multiple resource mappings can have the same starting position, i.e., the beginning of the same timeslot or subframe. This also facilitates receiving PRSs on multiple P-BWPs. The complimentary resource mapping is explained later on in detail with respect to FIG. 12.

Further options for aligning the PRS transmission between shared P-BWPs include: PRSs can be transmitted on the one or more P-BWPs using a common antenna port configuration if compared to the PRSs transmitted on the one or more further P-BWPs of the one or more further BSs.

As a general rule, different antenna ports can be associated with different time-frequency resource grids. For example, different antenna ports may be associated with different resource element mappings. By using the same antenna port for different P-BWPs, the UE can receive the PRSs across the different P-BWPs with a single OFDM demodulation process at the wireless interface. Thus, the UE can receive PRSs on multiple P-BWPs and utilize said receiving for positioning, e.g., using OTDOA.

Further options for aligning the PRS transmission between multiple P-BWPs include: using a common beam configuration. Here, similar propagation characteristics can be defined for the PRS transmission across the various P-BWPs.

Sometimes, a BS may need to transmit PRSs on multiple beams, e.g., to provide larger coverage. Different beams may be associated with different resource element mappings, e.g., within a shared P-BWP. In case, there are multiple shared P-BWP in different frequency allocation, having common beam configuration would be beneficial for the UE so that it can simultaneously process the received multiple shared P-BWP in order to obtain higher accuracy.

Next, at box 1002, the configuration of the one or more P-BWPs is provided to the UE. This may involve control signaling between the BS and the LMF 139. For example, the configuration may be forwarded to the LMF 139 and the LMF 139 may then pass the configuration onwards to the UE 101, via the RAN 111 using the channel 263, e.g., including PP control messages.

At box 1003, transmission of PRSs on the one or more P-BWPs is triggered. This can include controlling the wireless interface appropriately. The LMF may instruct the BS to transmit the PRSs. The transmission of the PRSs is in accordance with the configuration determined at box 1001. The PRSs may be transmitted on the channel 261.

Figure 10:
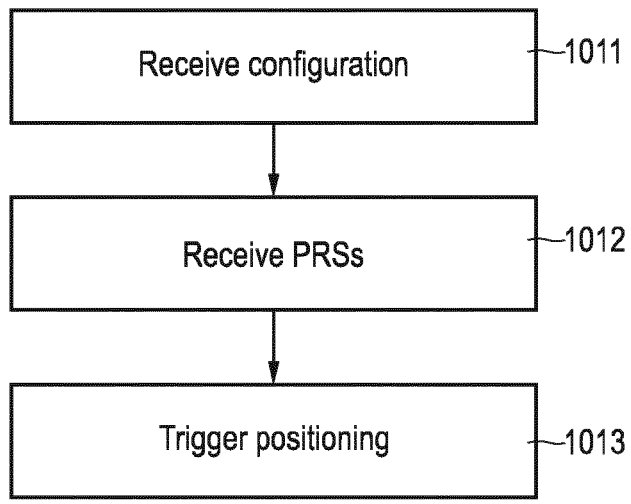
FIG. 10 is a flowchart of a method according to various examples.

FIG. 10 is a flowchart of a method according to various examples. The method of FIG. 10 can be executed by a UE. For example, the method of FIG. 10 could be implemented by the UE 101 connected or connectable to the RAN 111. For example, the method of FIG. 10 may be executed by the control circuitry 1012 of the UE 101 upon loading program code from the memory 1013.

At box 1011, a configuration of multiple P-BWPs is received. The multiple P-BWPs are associated with multiple BSs, i.e., with multiple cells of the multiple BSs. The P-BWPs are thus cell-specific.

For example, a single BS may transmit PRSs on multiple P-BWPs or on a single P-BWP. It would also be possible that multiple BSs use shared P-BWPs, e.g., by using complimentary resource mappings with a reuse factor corresponding to the count of BSs. It would also be possible that multiple BSs transmit PRSs on different P-BWPs.

The configuration can be generally indicative of a mapping of the multiple P-BWPs to identities of the BSs. I.e., the UE can determine which one of the one or more BSs uses which one of the multiple P-BWPs. This can be used in the positioning and when monitoring for the PRSs. In other words, the configuration can be generally indicative of a mapping of the multiple P-BWPs to identities of one or more cells associated with a respective one of the one or more BSs.

For example, at box 1011, a respective control message may be received on the channel 263. For example, the control message may include an information element according to the positioning protocol. The configuration may be generally received from the LMF 139 via control signaling on the RAN 111.

Box 1011 is interrelated to box 1002 (cf. FIG. 9).

Next, at box 1012, PRSs are received on the P-BWPs in accordance with the configuration received at box 1011. By receiving the PRSs on the multiple P-BWPs associated with multiple BSs, it becomes possible to receive PRSs from multiple BSs and, thereby, increase the accuracy of the positioning. For example, the accuracy of the multilateration and/or multiangulation can benefit if a larger count of reference positions, corresponding to the BSs transmitting the PRSs, is considered.

Next, at box 1013, the UE participates in positioning. This can include determining a TOA, TDOA, OTDOA. This can include performing or triggering a multilateration and/or multiangulation. Box 1013 can include control signaling between the UE and the LMF 139. For example, the LMF 139 can assist the UE in the task of multilateration and/or multiangulation or other tasks of the positioning.

The techniques of FIG. 9 and FIG. 10 thus enable support PRS transmission with multiple numerologies—i.e., on the multiple P-BWPs—and an efficient way to multiplex the PRS transmissions—i.e., on the multiple P-BWPs—so that a UE can receive the PRSs and utilize them for positioning. By using P-BWPs, further BWPs not used for PRS transmission can be flexibly configured. In particular, multiple BSs may use shared P-BWPs or time/frequency aligned P-BWPs which imposes certain constraints on the configuration of the P-BWPs. These constraints could otherwise conflict with the transmission of further signals other than the PRS. By using the P-BWPs, it is possible to obey these constraints and, at the same time, flexibly transmit the further signals. Details with such inter-working of multiple BSs in terms of P-BWPs are described in connection with FIG. 11.

Figure 11:
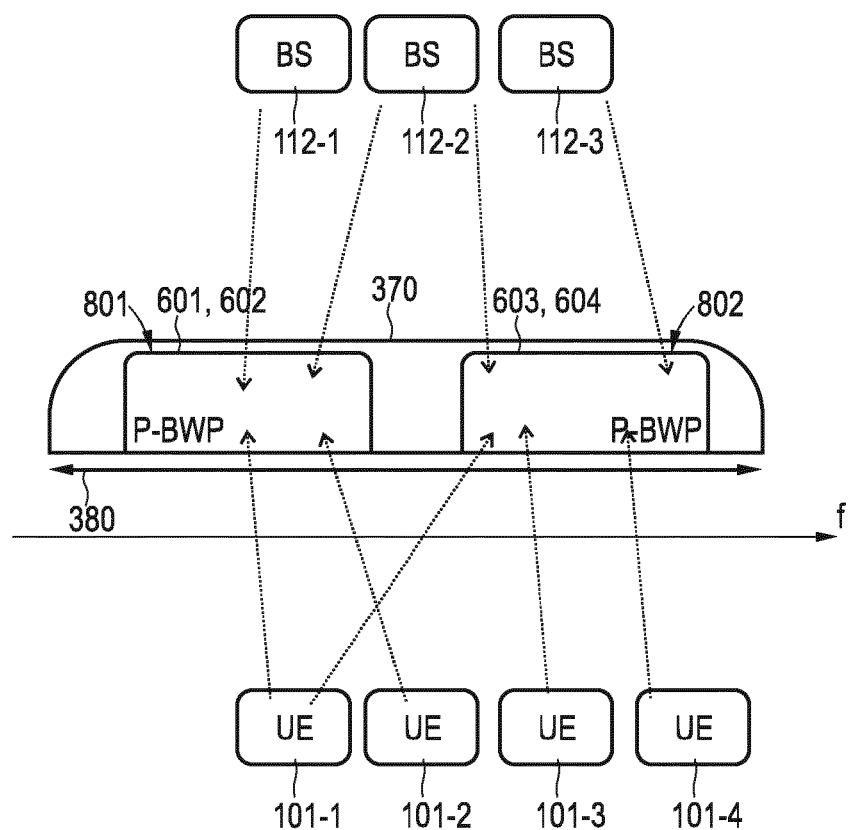
FIG. 11 is a schematic illustration of a mapping of BSs to bandwidth parts and UEs to bandwidth prats according to various examples.

FIG. 11 is a schematic illustration of a mapping between BSs 112-1-112-3 and P-BWPs 601-604. Each of the P-BWPs 601-604 can be implemented as explained for the BWPs 371-372 in FIG. 3, but for the purpose of transmitting PRSs.

In the example of FIG. 11, the BS 112-1 is mapped to the P-BWP 601; the BS 112-2 is mapped to, both, the P-BWP 602, 603, and the BS 112-3 is mapped to the P-BWP 604. As will be appreciated, in the example of FIG. 11, the BWPs 601-604 are cell-specific. Thus, the BSs 112-1-112-4 need to interwork to agree on these BWPs 601-604, e.g., their frequency position and frequency bandwidth (frequencies) and transmission timing, etc.

The P-BWPs 601, 602 have the same numerology 801 and frequency. For example, they may also have the same transmission timing (not illustrated in FIG. 11) and thus be shared P-BWPs. Similar observations apply to the P-BWPs 603, 604.

Figure 12:
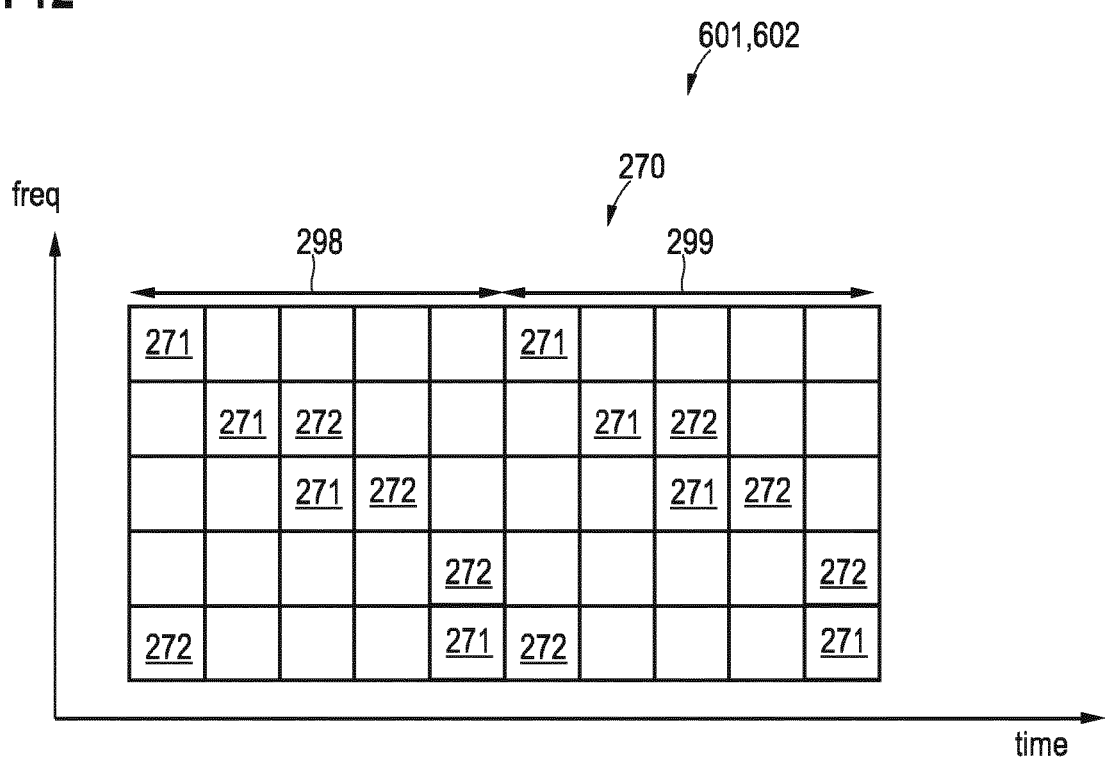
FIG. 12 schematically illustrates multiple, complementary resource mappings according to various examples.
Figure 16:
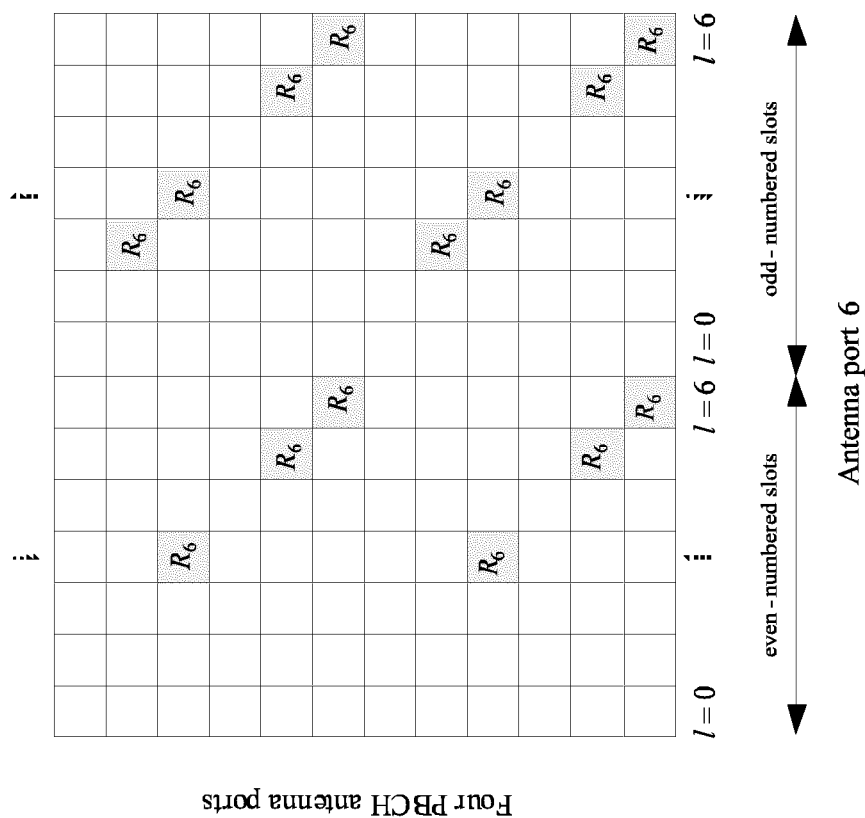
FIG. 16 schematically illustrates multiple, complementary resource mappings according to the prior art.
Figure 16:
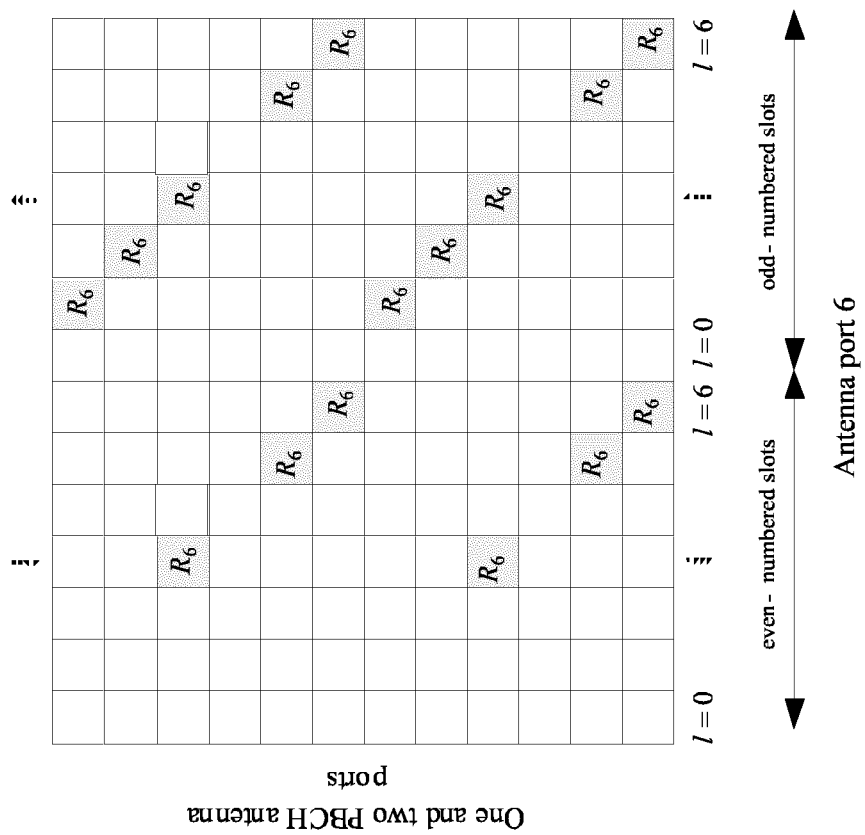

Now assuming that the P-BWPs 601, 602 are shared: to avoid collision of the transmission of the PRSs on the shared P-BWPs 601, 602, the PRSs are transmitted by the BS 112-1 and the BS 112-2 using a common antenna port configuration and using complimentary resource mappings. This is illustrated in FIG. 12. FIG. 12 is comparable with FIG. 16 (prior art). FIG. 12 illustrates a simplified version of FIG. 16. FIG. 12 illustrates time-frequency resource elements for two timeslots 298, 299, the two timeslots forming a subframe.

In the concrete case of FIG. 12, a reuse factor of two is implemented: the BS 112-1 and the BS 112-2 use the same time-frequency resource grid within the timeslots 298, 299; the resource elements 271, 272 used by each one of the BSs 112-1, 112-2, respectively, to transmit the PRSs 150 are offset in frequency domain by a single time-frequency resource element. As already specified above, the reuse factor specifies the count of BSs accessing the same time-frequency resource grid with complimentary resource mappings to transit the PRSs. The allocation used by the shared P-BWPs 601, 602 could accommodate for a reuse factor of, e.g., five—if further BSs were mapped to the allocation of the P-BWPs 601, 602. Note that the diagonal pattern of the resource elements 271, 272 is repeated every fifth symbol. Thus, up to five BSs could use complimentary resource mappings.

Referring again to FIG. 11, different ones of the UEs 101-1-101-4 receive PRSs on different ones of the BWPs 601-604. For example, this can include checking, at the UEs 101-1-101-4, whether a respective BSs 112-1-112-3 is in coverage.

As a general rule, the various UEs 101-1-101-4 can be configured individually by the LMF 139; or using broadcast control signaling.

Next, details with respect to such signaling between the various participating entities—e.g., the BS 112, the UE 101, and the LMF 139—are explained in connection with FIG. 13.

Figure 13:
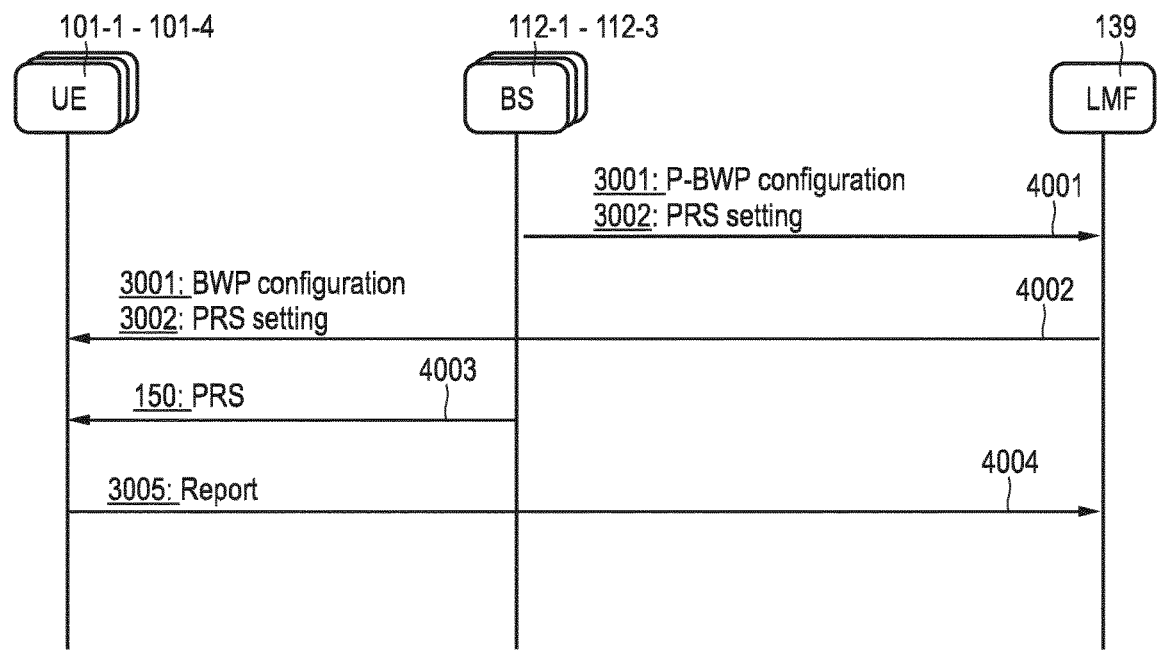
FIG. 13 is a signaling diagram according to various examples.

FIG. 13 is a signaling flowchart illustrating communication between the BSs 112-1-112-3 (cf. FIG. 11) of the RAN 111, the LMF 139 and the UEs 101-1-101-4 (cf. FIG. 11). For example, the signaling of FIG. 13 could implement the methods according to FIG. 9 and FIG. 10.

Initially, at 4001, the BSs 112-1-112-4 provide a configuration 3001 of the P-BWPs 601-604 to the LMF 139. Each BSs 112-1-112-4 may provide its respective part of the configuration 3001. To facilitate the UE 101 listening for the PRSs 150 transmitted by a given BS 112-1-112-4, the configuration 3001 can be indicative of a mapping of the multiple P-BWPs 601-604 to the identities of the BSs 112-1-112-3. Details of the mapping have been explained in connection with FIG. 11.

Optionally, the BSs 112-1-112-4 could also provide a setting 3002 of the PRSs 150 to be transmitted on the one or more P-BWPs 601-604 to the LMF 139. Examples of such setting 3002 include: transmission power; resource mapping of PRSs; antenna port; and/or transmission beam.

Next, at 4002, the LMF 139 provides the configuration 3001 and, optionally, the setting 3002 to the UEs 101-1-101-4. 4002 could include broadcast signaling.

For example, the control signaling at 4002 may be implemented using a positioning protocol. Examples include an LTE positioning protocol Protocol Data Unit (LPP PDU) transmitted between the LMF 139 and the UE 101 according to 3GPP TS 38.305 V15.3.0 (2019-03), section 6.4.2. In further detail, a NR PP A PDU (NRPPa PDU) according to 3GPP TS 38.305 V15.3.0 (2019-03), section 6.5.2 may be used to implement the control signaling at 4002.

As a general rule, various options are available for implementing the configuration 3001. For example, the configuration 3001 could be indicative of modulation numerologies 801, 802—e.g., SCS—of the P-BWPs 601-604. Different P-BWPs 601-604 can have the same or different numerologies 801, 802.

Also, the configuration 3001 could be used to indicate whether a P-BWP 601-604 is activated or deactivated. As a general rule, P-BWPs can be disabled and enabled by a BS: in FIG. 11, the BS 112-4 disables all P-BWPs and thus does not transmit PRSs 150. Such techniques are based on the finding that, in reference implementations, PRS 150 are periodically transmitted by the BS with no option to disable PRS transmission. This may not be efficient particularly in a case where there is no demand for positioning services. The techniques described herein support a lean carrier where the target is to minimize any periodic/broadcast signal from a BS. For this, a BS may disable/enable the PRS transmission. The BS can provide information on the activation/deactivation as part of the configuration 3001 to the LMF 139 which can then inform the UE 101 accordingly. In the context of OTDOA: in case the configured reference cell deactivates PRS transmission, the LMF 139 can provide a new reference to the UE or the UE can provide suggested reference cell, e.g. the cell which produces smallest TDOA.

Multiple P-BWPs can be multiplexed in both time domain and frequency domain (cf. FIG. 11 where frequency multiplexing of the P-BWPs 601, 602 with the P-BWPs 603, 604 in frequency domain is depicted). To this respect, it would be possible that the configuration 3001 is indicative of a frequency of the multiple positioning bandwidth parts 601-604. Such frequency multiplexing can facilitate simultaneous transmission timings of the P-BWPs: the UE 101 can receive the PRS on the frequency-multiplexed P-BWPs simultaneously. This helps to shorten the time required for PRS transmission. Also, a temporal resolution of the positioning is high.

As a general rule, the transmission timings may be expressed in a common time base or reference time base. For example, system frame number (SFN), subframe numbers could be used to specify the transmission timing.

Figure 14:
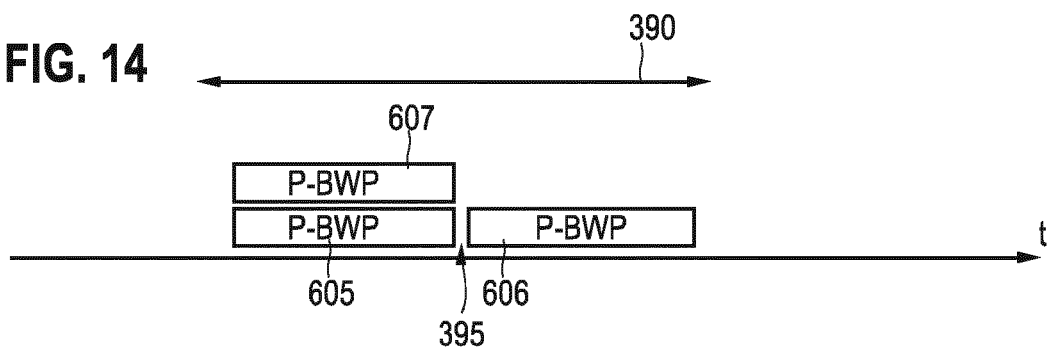
FIG. 14 schematically illustrates a timing of transmission of PRSs on bandwidth parts according to various examples.
Figure 15:
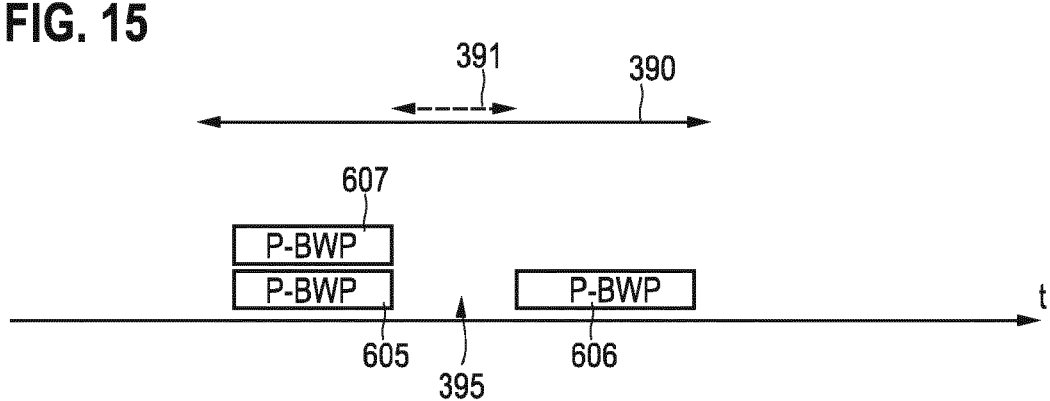
FIG. 15 schematically illustrates a timing of transmission of PRSs on bandwidth parts according to various examples.

The transmission timing of the P-BWPs may also configure a time multiplexing: here, transmission of the PRSs on the multiple P-BWPs may be offset in time domain. Thus, alternatively or additionally, it would be possible that the configuration is indicative of a transmission timing of the multiple P-BWPs 601-604. This means that the PRSs may be transmitted in accordance with a certain timing on the P-BWPs 601-604. To give an example, it would be possible that the transmission timing is in accordance with a repetitive measurement gaps of a transmission protocol implemented on the wireless link 114 of the RAN 111. This is illustrated in FIG. 14: here, the measurement gap 390 is defined and the PRSs are transmitted on the P-BWPs 605, 606 time-sequentially, i.e., time multiplexed (on the other hand, the P-BWPs 605, 607 have a synchronized transmission timing; the P-BWPs 605-607 illustrated in time-domain in FIG. 14 and FIG. 15 can correspond to the P-BWPs 601-604 illustrated in frequency-domain in FIG. 11.

As a general rule, to accommodate the PRS transmission on the multiple, time-multiplexed P-BWPs 605-606, a duration of the measurement gap 390 can be dimensioned sufficiently long, e.g., including multiple consecutive subframes.

If the P-BWPs 605-606 employ different numerologies 801, 802, it is possible to switch between different receiver settings or receiver bandwidths at the receiving UE 101 during a switching time 395. Thus, a respective time-offset may be provisioned between the transmission timings of the P-BWPs 605-606.

Outside the measurement gap 390, further signals—e.g., on the channel 262 or the channel 263—are transmitted; these further signals are not transmitted during the measurement gap 390. During the measurement gaps 390, the further signals—different from PRSs and, e.g., encoding control messages or payload data—are not be transmitted, to mitigate interference and increase positioning accuracy. Thus, there may be reserved timeslots or subframes—implementing the measurement gap 390—during which the transmission of the PRSs on the P-BWPs is activated. In case there are further signals to be transmitted during the measurement gap 390, the measurement gaps 390 may be punctured by an intermittent time gap 391 during which further signals are transmitted, but PRSs transmission on the P-BWPs 605-607 is temporarily suspended (cf. FIG. 15). This information on such puncturing can also be included in the configuration 3001.

The duration of the measurement gap 390 can generally depend on an accuracy requirement of the positioning. For example, if a higher accuracy is required, then a longer measurement gap 390 can be used. The transmission timings of the P-BWPs 605-607 can be adjusted: longer transmission of PRSs becomes possible. The accuracy may be signaled to a BS by a UE; or may be defined by the BS. In another example, the measurement gap 390 may be UE specific. In this case, a UE with higher accuracy requirement is configured with longer measurement gap. The transmission timings of the P-BWPs 605-607 can be fixed/limited. Thus, UEs with a shorter measurement gap 390 may only listen to a fraction of the overall PRS transmission. Some BSs can be configured to extend PRS transmission within that measurement gap. Such techniques help to conserve energy at the UE.

Similar considerations also apply to the frequency domain: e.g., the frequency bandwidth of the P-BWPs ca depend on the accuracy requirement of the positioning. If a higher accuracy is required, then a wider bandwidth can be used. Some BSs can be configured to extend bandwidth of PRS transmission. It would be possible that UEs only listen for PRSs on a fraction of the overall bandwidth of the P-BWPs. Such techniques help to conserve energy at the UE.

Summarizing, various techniques are based on the finding that—in order to support positioning measurements at the UE—, the UE needs to receive PRSs from multiple BSs. 3GPP NR supports multiple numerologies, i.e., SCSs, and sometimes it may become problematic to multiplex PRSs from multiple BSs. Above, an efficient scheme to multiplex PRSs that may have different numerologies so that the UE can utilize those PRS simultaneously to enhance positioning accuracy. Different P-BWPs can be used to implement different numerologies. Furthermore, the proposed scheme can also support lean-carrier operation where the PRS transmission can be disabled/enabled by the network.

The techniques described above facilitate introducing P-BWPs that support multiple numerologies. In case of the availability of multiple P-BWPs, the P-BWP share some parameters—e.g., alignment in time domain and frequency domain—and thus the can utilize more PRSs received on more than one P-BWP. A BS can enable/disable transmission of PRSs on a P-BWP or can even enable/disable a P-BWP altogether. The UE can be generally informed on the P-BWP configuration by control signaling of a positioning protocol and/or broadcast messages. For example, the UE can be informed whether there is a collision of PRS transmission on a P-BWP with other signals/channels. Then, the PRS transmission can be punctured accordingly.

Figure 17:
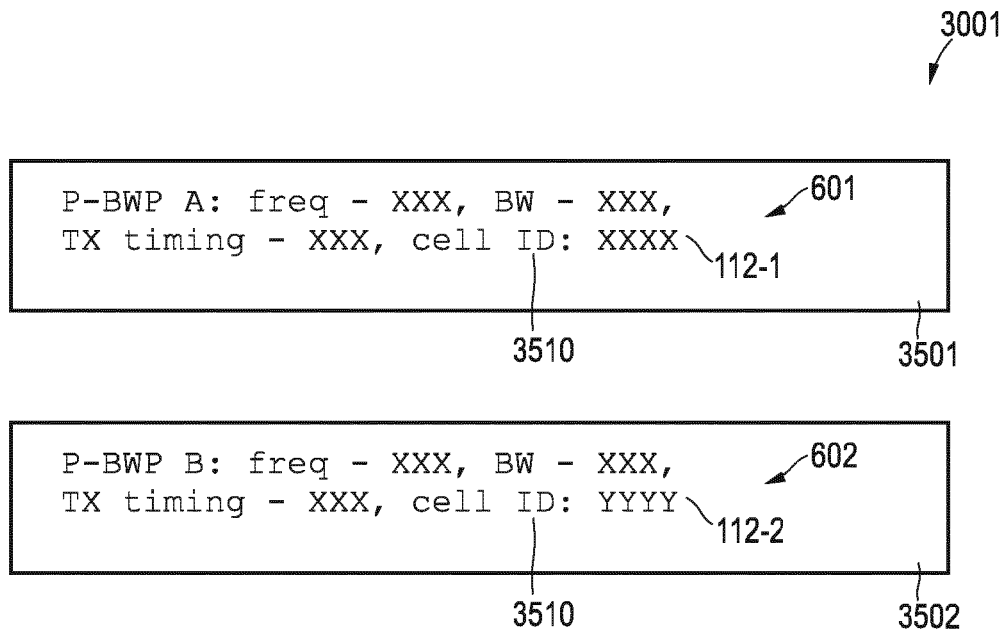
FIG. 17 schematically illustrates a configuration of multiple positioning bandwidth parts according to various examples.
Figure 18:
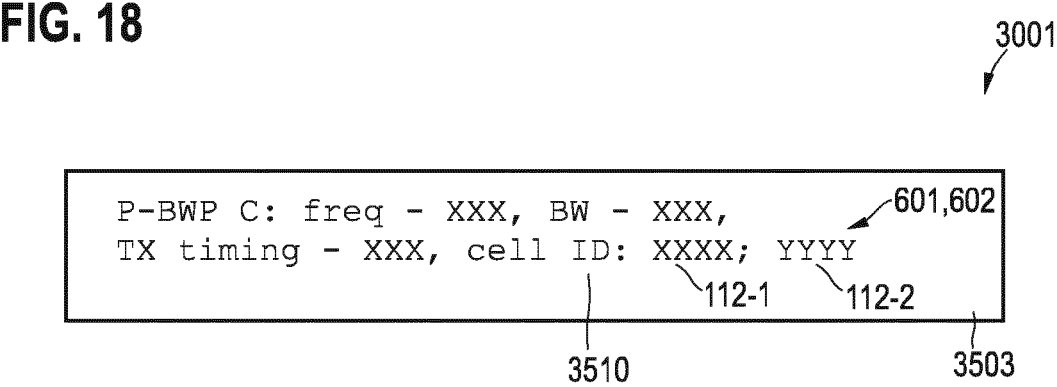
FIG. 18 schematically illustrates a configuration of multiple positioning bandwidth parts according to various examples.

FIG. 17 and FIG. 18 illustrate aspects with respect to the configuration 3001. In FIG. 17 and FIG. 18 two possible implementations for providing the configuration 3001 for the P-BWPs 601, 602 (cf. FIG. 11).

In FIG. 17, two separate information elements 3501, 3502 are used for the P-BWPs 601, 602 of the BSs 112-1, 112-2. Because the P-BWPs are shared—i.e., use similar configuration parameters such as frequency position, bandwidth, transmission timing, and numerology in the non-limiting illustrated example—similar values for the configuration parameters are included in the information elements 3501, 3502. Differently, in the example of FIG. 18, the configuration 3001 includes a single information element 3503 that includes the mapping 3510 to both BSs 112-1, 112-2.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For instance, various examples have been described in which a LS implements a LMF to facilitate positioning of a UE. The techniques described herein can also be used in connection with other implementations of the LS.

For further illustration, various examples have been described in connections with implementations of ANs by BSs of a cellular network, the techniques can also be applied to other types of communication systems.

Still further, while various examples have been described in connection with OTDOA or TDOA positioning, other kinds and types of positioning techniques using PRSs may benefit from the techniques described herein. For example, the techniques described herein can also be applied to other measurement method, such as signal strength measurements (e.g., Reference Signal Receive Power, RSRP; or Signal to Interference plus Noise Ratio, SINR).

The invention claimed is:

1. A method of operating a wireless communication device, the method comprising:
   receiving a configuration of multiple bandwidth parts, each bandwidth part of the multiple bandwidth parts being associated with a respective access node of multiple access nodes;
   receiving, in accordance with the configuration, positioning signals on each bandwidth part of the multiple bandwidth parts from the respectively associated access node of the multiple access nodes, wherein the positioning signals are transmitted by the multiple access nodes on the multiple bandwidth parts; and participating in positioning of the wireless communication device based on said receiving of the positioning signals, wherein the configuration is indicative of a mapping of a respective one of the multiple bandwidth parts to an identity of the respectively associated access node of the multiple access nodes, and wherein the multiple bandwidth parts are exclusively reserved for a transmission of the position signals.

2. The method of claim 1,
wherein the configuration is indicative of numerologies of the multiple bandwidth parts.

3. The method of claim 2,
wherein at least two bandwidth parts of the multiple bandwidth parts have different numerologies.

4. The method of claim 2,
wherein at least two bandwidth parts of the multiple bandwidth parts have a common numerology.

5. The method of claim 4,
wherein the at least two bandwidth parts have a common frequency and a common transmission timing.

6. The method of claim 1,
wherein the positioning signals are received simultaneously on at least some of the multiple bandwidth parts.

7. The method of claim 1,
wherein the configuration is indicative of a frequency of the multiple bandwidth parts.

8. The method of claim 1,
wherein the configuration is indicative of a transmission timing of the multiple bandwidth parts.

9. The method of claim 8,
wherein the transmission timing is in accordance with repetitive measurement gaps of a transmission protocol of the multiple access nodes.

10. The method of claim 9,
wherein a duration of the repetitive measurement gaps depends on an accuracy of said positioning.

11. The method of claim 1,
wherein a transmission of the positioning signals is punctured on at least one of the multiple bandwidth parts in accordance with a transmission timing of one or more further signals transmitted by at least one of the multiple access nodes.

12. The method of claim 11,
wherein the configuration is indicative of said puncturing.

13. The method of claim 1,
wherein the configuration is indicative of activation or deactivation of one or more of the multiple bandwidth parts at at least one of the multiple access nodes.

14. The method of claim 1,
wherein a receive bandwidth with which the positioning signals are received depends on at least one of an accuracy of said positioning or a receiver bandwidth capability of the wireless communication device.

15. A wireless communication device comprising control circuitry, the control circuitry being configured to:
receive a configuration of multiple bandwidth parts, each bandwidth part of the multiple bandwidth parts being associated with a respective access node of multiple access nodes;
receive, in accordance with the configuration, positioning signals on each bandwidth part of the multiple bandwidth parts from the respectively associated access node of the multiple access nodes, wherein the positioning signals are transmitted by the multiple access nodes on the multiple bandwidth parts; and
participate in positioning of the wireless communication device based on said receiving of the positioning signals, wherein the configuration is indicative of a mapping of a respective one of the multiple bandwidth parts to an identity of the respectively associated access node of the multiple access nodes, and wherein the multiple bandwidth parts are exclusively reserved for a transmission of the position signals.

* * * * *